United States Patent [19]

Klose et al.

[11] 4,402,782
[45] Sep. 6, 1983

[54] TIRE BUILDING MACHINE

[75] Inventors: Karl W. Klose, Findlay; Gary H. Benjamin, Ada, both of Ohio

[73] Assignee: Cooper Tire & Rubber Company, Findlay, Ohio

[21] Appl. No.: 331,263

[22] Filed: Dec. 16, 1981

[51] Int. Cl.³ .......................................... B29H 17/20
[52] U.S. Cl. .................................. 156/414; 156/408; 156/416; 156/420; 156/421
[58] Field of Search ............... 156/414, 416, 417, 420, 156/421, 408, 126, 127, 111, 396

[56] References Cited

U.S. PATENT DOCUMENTS

| | | | |
|---|---|---|---|
| 3,790,425 | 2/1974 | Leblond | 156/416 |
| 4,053,342 | 10/1977 | Appleby et al. | 156/126 |
| 4,105,486 | 8/1978 | Cantarutti | 156/126 |
| 4,144,114 | 3/1979 | Enders | 156/414 |
| 4,230,517 | 10/1980 | Enders | 156/396 |
| 4,288,265 | 9/1981 | Pacciarini et al. | 156/126 |

Primary Examiner—Michael W. Ball
Attorney, Agent, or Firm—Kemon & Estabrook

[57] ABSTRACT

A tire building machine including a building drum for receiving a belt-tread assembly and a pair of coaxial shafts having disc members freely rotatable thereon for receiving and supporting a tire carcass. The disc members and shafts are pivotally movable as a unit and the disc members are also movable with respect to one another for engaging annular beads formed on said carcass to effect a seal therewith and permit the introduction of air to inflate said carcass to assume a toroidal shape. A radially expansible and contractable transfer ring, that is axially movable, engages the belt-tread assembly and transfers same from the drum to the carcass prior to the pivoting of the carcass, belts and tread stock into engagement with a rotatably driven stitcher apparatus.

14 Claims, 19 Drawing Figures

TIRE BUILDING MACHINE

BACKGROUND OF THE INVENTION

This invention relates to a process for the assembly of radial tire components and to an apparatus for practicing said process.

In the evolutionary course of developing and producing the state of the art radial ply pneumatic tire, those skilled in the art, have created a tire structure consisting generally of two major sub-assemblies or two distinct groups of components, depending on the assembly process.

The first sub-assembly, referred to herein as the "first stage carcass" consists of one or more body plys of rubber coated cord, a pair of axially parallel beads and layers of rubber that will comprise the sidewall stock of the carcass. These tire elements are assembled and consolidated on a cylindrical building drum so that the first stage carcass sub-assembly consists of one or more body plys which, in the case of a radial tire, the body ply cords are essentially parallel to the rotational axis of the building drum and the first stage carcass assembled thereon; the two beads are anchored to the opposing axial extremities of the cylindrical first stage carcass, said beads being parallel one to the other and coaxial with the rotational axis of said first stage carcass; and the layers of sidewall stock are circumferentially consolidated to the outer surface of the first stage carcass, axially disposed one from the other and adjacent to one of the beads.

Upon completion of the first stage carcass sub-assembly, it is then transformed from its cylindrical shape to that of a toroid so that the radial body cords, essentially parallel to the rotational axis are made to assume the configuration of meridians to said rotational axis.

Completion of the green radial tire carcass is then accomplished by consolidating one or more relatively non-extensible belts of suitable cord to the outer equatorial circumference of the toroid and finally symmetrically disposing about the same equatorial circumference a band of tread stock. After the belts and tread stock are consolidated with the toroidal first stage carcass, the finished green radial tire carcass is removed from the building machine and disposed in a suitable mold for final shaping and vulcanization of the various rubber components, thereby forming a cured tire.

The sub-assembly consisting of one or more belts and the tread stock will hereinafter be referred to as the "belt-tread stock assembly."

Conversion of the cylindrical first stage carcass to the toroidal shape and attaching the belt-tread components thereon is achieved in a variety of ways, the more conventional being:

(a) Assembly of the first stage carcass components on a holding drum that is capable of causing the consolidated cylindrical shaped first stage carcass to be transformed into a toroidal shape and then completion of the green radial tire carcass by attaching equatorially thereon the belt and tread stock elements.

This is usually referred to as the "single stage process" of green radial tire assembly.

(b) Assembly of the first stage carcass on a conventional collapsable building drum that is incapable of transforming a cylindrical carcass to toroidal shape, and, upon completion of that cylindrical sub-assembly, transferring same to a different drum or holding means whereby said first stage carcass is held and manipulated during its transformation to toroidal shape and the assembly of belts and tread stock thereon.

Appropriately, this is generally referred to as the "two stage process."

The number of conventional construction process options is further expanded by the alternatives of either assembling and consolidating the belts and tread stock directly on the toroidal first stage carcass or the assembly and consolidation of the belts and tread stock on a separate drum and then conveying that belt-tread sub-assembly to a coaxial position with the toroidal shaped first stage carcass where upon said toroidal first stage carcass is caused to be further expanded into circumferential contact and consolidation with the inner surface of the belt-tread sub-assembly.

The quality of the completed radial ply tire requires that dimensionally accurate components are precisely assembled and that such precision of dimension and assembly be retained and protected throughout the balance of the tire manufacturing process.

State of the art second stage radial tire building machines generally consist of a bed upon which there is axially aligned and mounted at opposite ends thereof a head stock holding and capable of rotational manipulation of a collapsible belt building drum and, on the opposite end, a tail stock capable of supporting a first stage carcass whereby said first stage carcass is transformed from cylindrical to toroidal shape, united with a belt-tread stock assembly and then rotated about its axis while final consolidation is accomplished by stitching.

SUMMARY OF THE INVENTION

Accordingly, the primary concept of this invention is to provide a second stage radial tire assembly machine whereby a belt-tread stock assembly is precisely assembled on a building drum and then transported from the building drum to an assembly position whereupon said belt-tread stock assembly will be attached to a first stage carcass assembly which in turn is moved to a consolidation position whereupon the first stage carcass and the belt-tread assembly are consolidated by stitching, the dimensional and orientational precision of the tire components being maintained throughout.

In addition, the present invention discloses a belt-tread stock assembly drum that will permit the precise orientation of belt and tread stock elements installed thereon. The precise orientation being established by a guiding means and a rigid drum deck surface and are then preserved by the concise manipulation of the drum surface segments when they are positively retracted in unison for release of the belt-tread stock assembly.

The belt tread stock assembly transfer ring of the present invention will preserve the precision of the belt-tread stock assembly during its removal from the belt-tread stock assembly drum and the transportation of same to a toroidal shaped first stage carcass suitably held by the final assembly stage.

The final assembly stage may consist of one or more pairs of coaxial supports having freely rotatable disk members mounted on the common ends thereof and same are axially manipulated with respect to each other, said disk members sealably engaging and retaining the bead areas of a first stage carcass during the pneumatic transformation of said carcass from the cylindrical shape to toroidal.

The sealably engagement of the bead area and the disk members is maintained during the attachment of the belt-stock assembly to the first stage carcass and during the consolidation of the green tire components by stitching.

DESCRIPTION OF THE PREFERRED EMBODIMENT

The tire building machine comprises in general a radially expansible and contractable building drum upon which conventional belts are formed after which tread stock is positioned upon the belts. The building drum is provided with a rotatably driven member, that is connected to a shaft projecting from a conventional building machine head stock, whereby said belt-tread stock assembly may be positioned on the rotating drum. A transfer ring is provided for transferring from the building drum the belt-tread stock assembly formed thereon to a final tire assembly mechanism.

Figure 1:
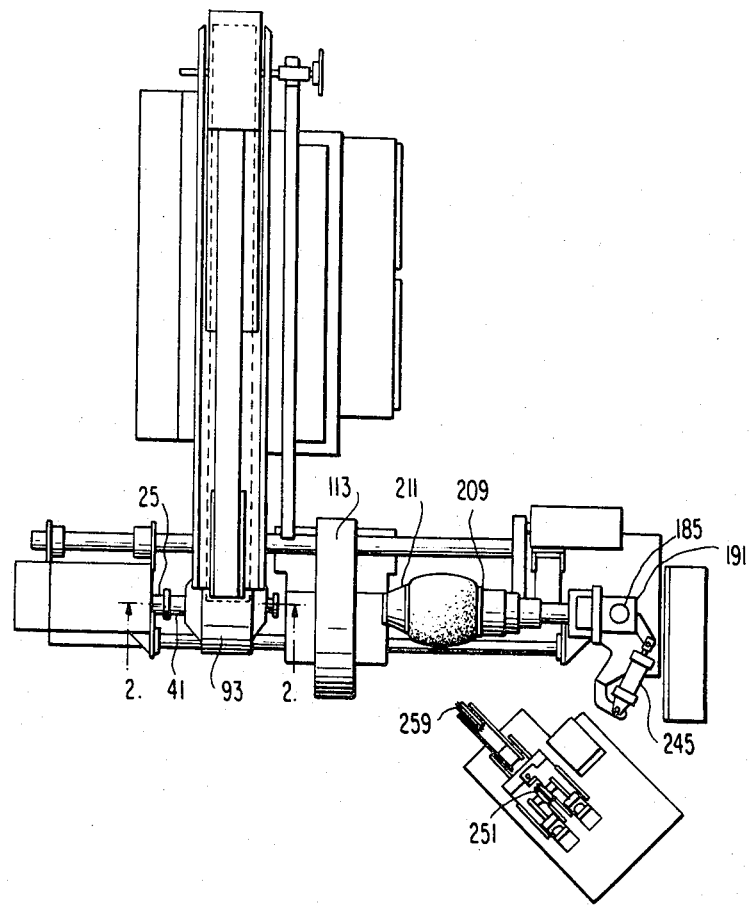
FIG. 1 is a plan view of a tire building machine embodying the present invention.

The transfer ring is configured to contract radially about the belt-tread stock assembly formed on the building drum in order to shift said assembly axially to the right of the building drum, when viewing FIG. 1, to the final assembly mechanism. The final assembly mechanism embodies a pair of disc members mounted upon the common ends of a pair of coaxial shafts which have a threaded rod positioned therein with nuts mounted thereon for moving said shafts and disc members toward and away from one another. A first stage tire carcass is positioned upon the disc members which are then moved apart to facilitate the disc members engaging the annular bead areas formed on said carcass. The carcass is inflated with fluid under pressure which draws the bead area of the carcass into sealing engagement with the disc members while at the same time the carcass assumes a toroidal shape.

The transfer ring moves the belt-tread stock assembly into concentric relationship with the tire carcass so that the tire carcass in the final stages of expanding will engage said assembly. After the carcass engages and adheres to the belt-tread assembly the transfer ring expands releasing the assembly and moves axially towards the building drum to engage and pick-up another belt-tread stock assembly. After the transfer ring moves away from the carcass and belt-tread stock assembly the shafts and disc members are pivoted about a suitable support to move said carcass and belt-tread stock assembly into engagement with a rotatable stitcher driver wheel mechanism for stitching said belt-tread stock assembly to the carcass. The carcass is then removed from the disc members and another first stage carcass is placed upon the disc members prior to returning said shafts and disc members to their initial position for the reception of another belt-tread stock assembly.

THE BUILDING DRUM

Figure 2:
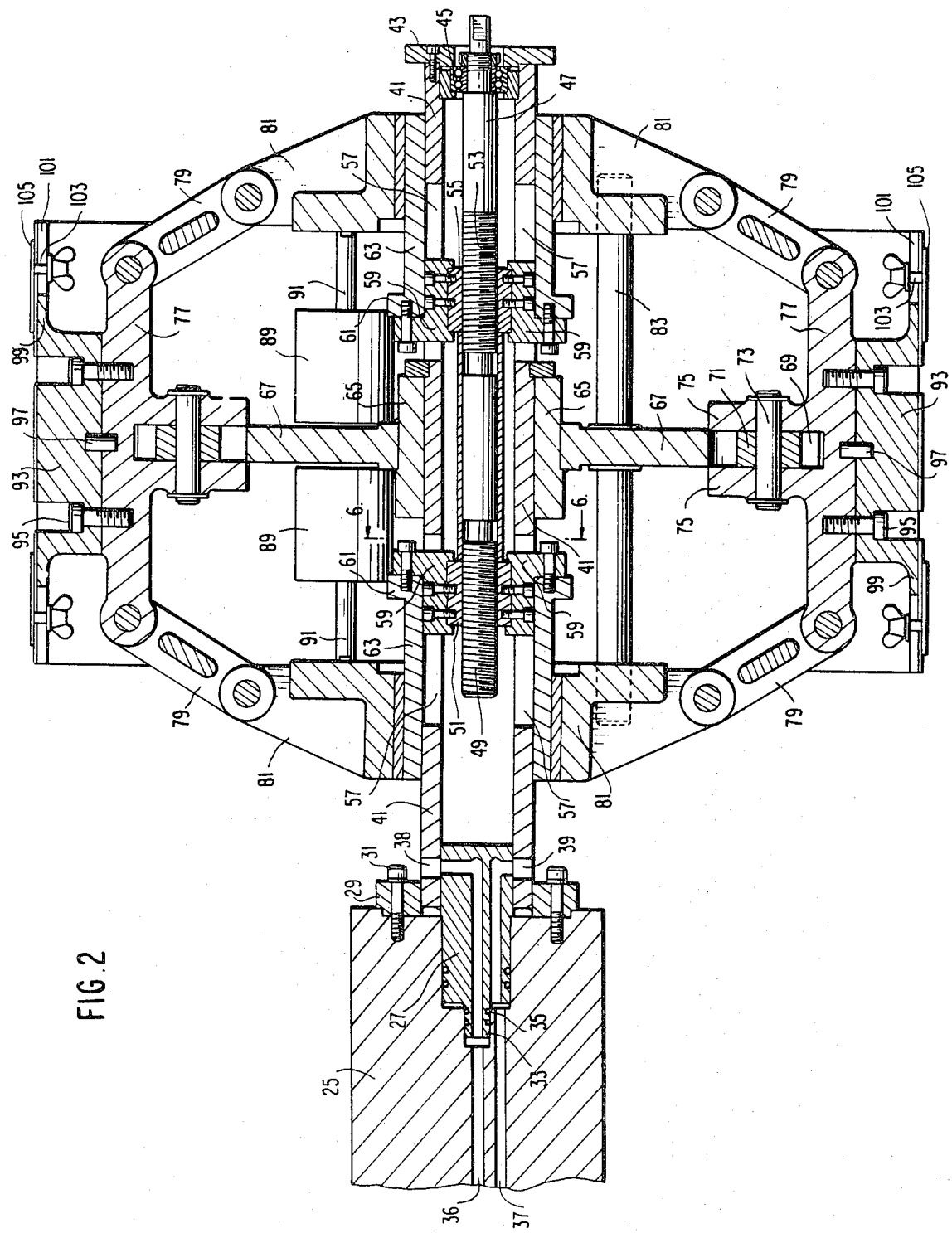
FIG. 2 is a vertical sectional view of the building drum for the belts and tread stock, the view being taken on the lines 2—2 of FIG. 1.

Referring to FIG. 2 there is shown an end portion of a shaft 25 that is rotatably driven from a conventional building machine head stock, not shown. The forward end of the shaft 25 is drilled and counterdrilled to receive an adaptor plug 27 which terminates in an annular flange 29 that is secured to the end of the shaft by suitable bolts 31. The plug 27 is formed with a reduced end portion 33 that projects into the counterdrilled portion and suitable "o" rings 35 are provided on the plug 27 and the reduced end 33 to effectively seal the plug with respect to the shaft. The shaft 25 is provided with suitable air passages 36 and 37 that communicate with passageways 38 and 39 in the plug 27. The annular flange 29 of the plug 27 has secured thereto, by welding or other suitable means, a tubular shaft extension 41 which terminates in a cap member 43 having a conventional bearing assembly 45 associated therewith. The bearing assembly 45 supports one end of a rod 47 with the other end of the rod 47 being provided with a threaded portion 49 having a nut 51 mounted thereon. A portion of the rod 47 intermediate the bearing supported end and the threaded portion 49 is also threaded at 53 for the reception of a nut 55. The threaded areas 49 and 53 are threaded in opposite directions so that rotation of the rod 47 will result in the nuts 51 and 55 moving towards or away from one another.

Figure 3:
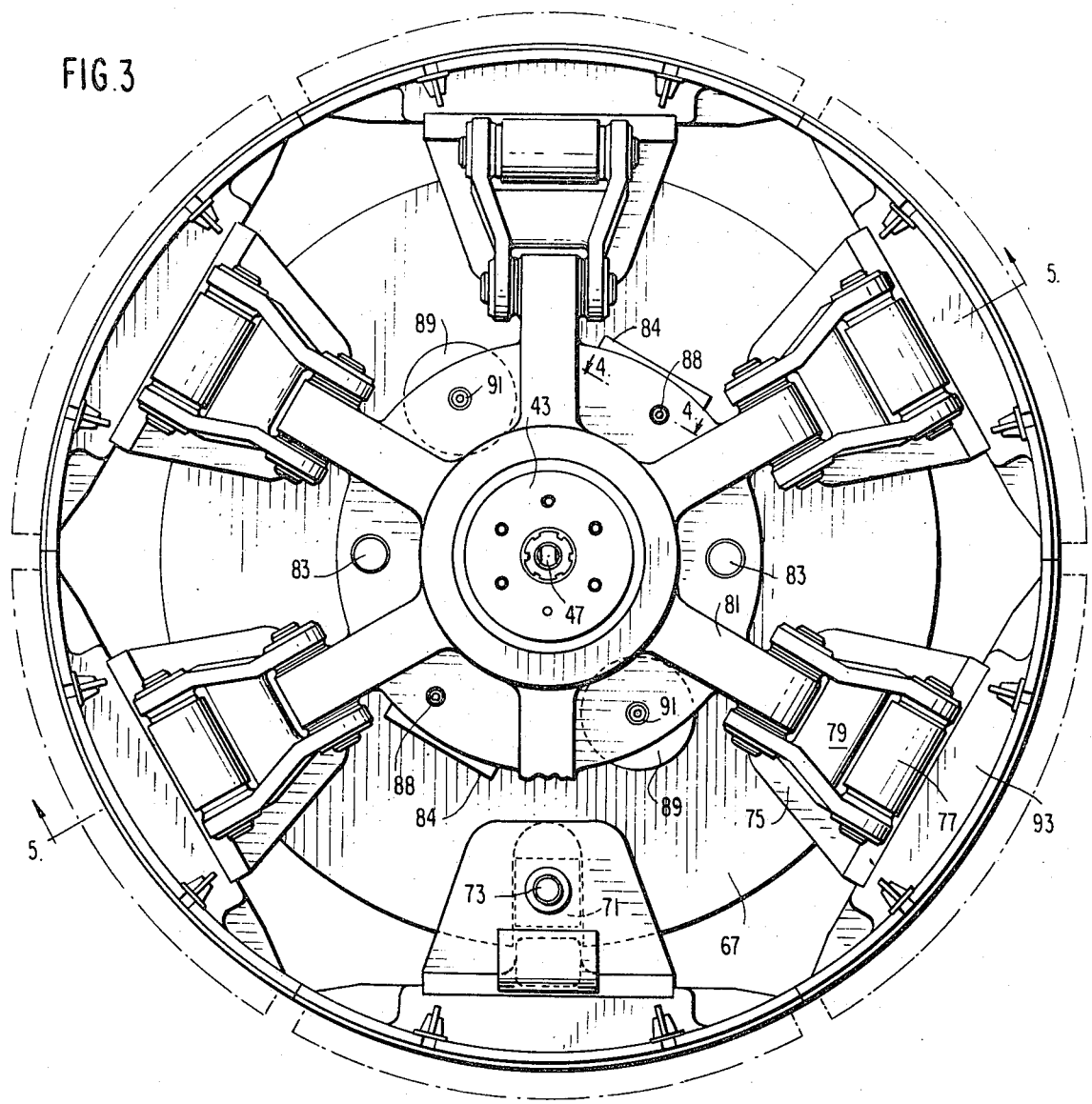
FIG. 3 is an end view of the building drum shown in FIG. 2.
Figure 4:
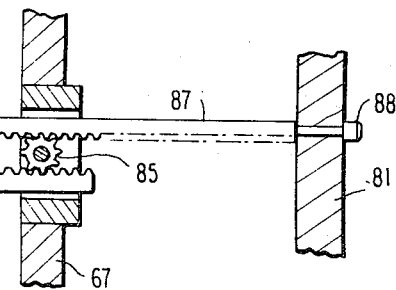
FIG. 4 is a detailed view of a contraction and expansion equalizer mechanism for elements of the building drum, the view being taken on the line 4—4 of FIG. 3.
Figure 5:
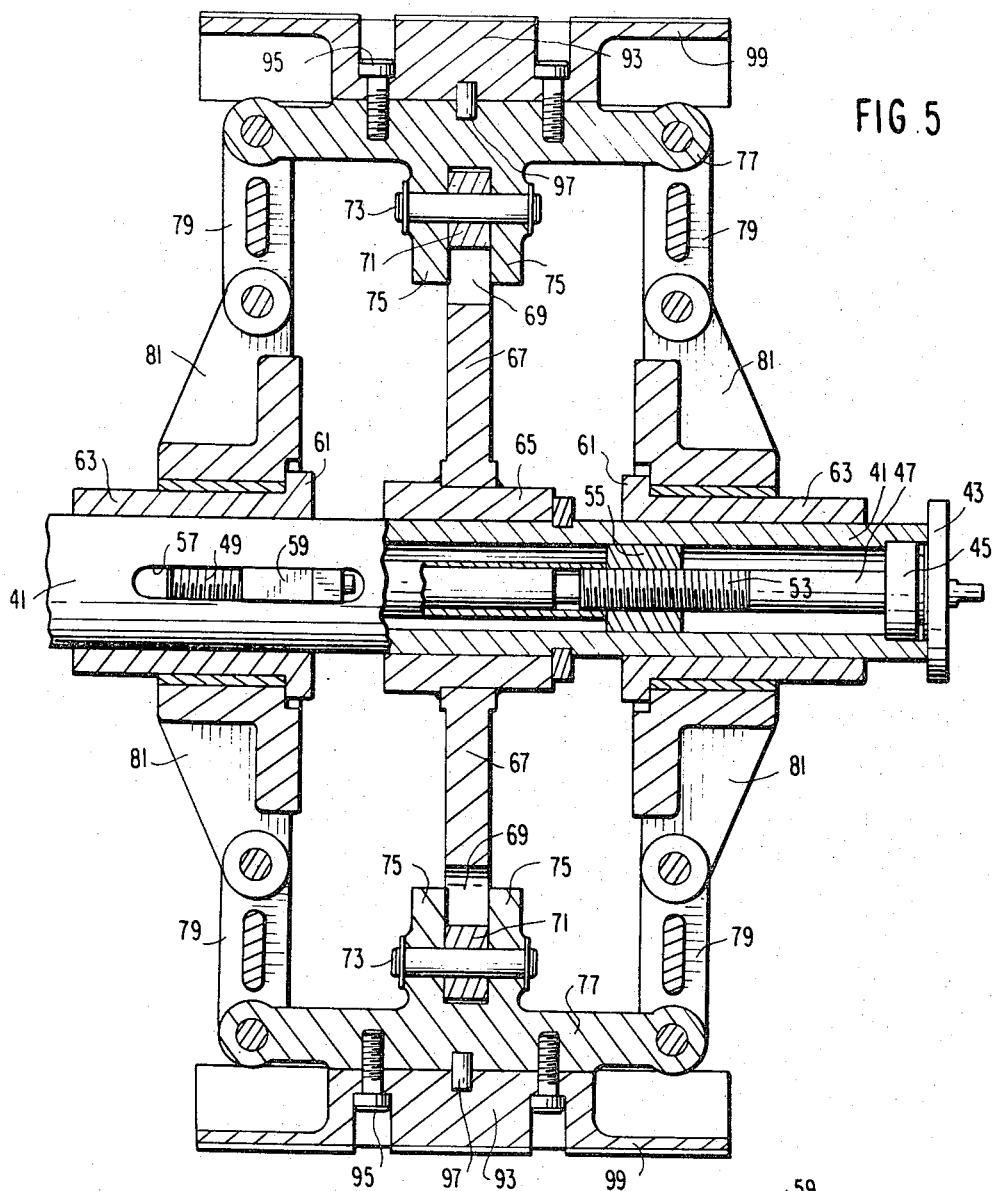
FIG. 5 is a horizontal sectional view of the building drum, the view being taken on the line 5—5 of FIG. 3.
Figure 6:
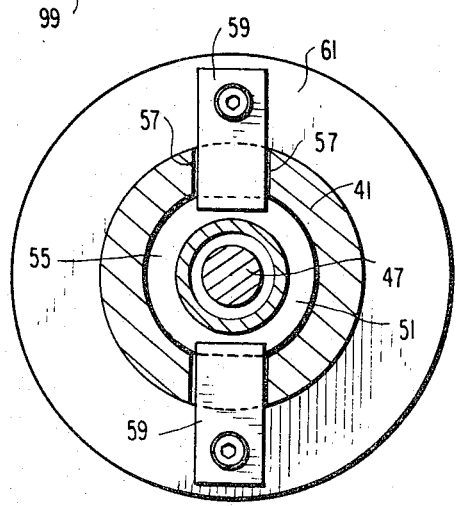
FIG. 6 is a detailed sectional view of a portion of the building drum, the view being taken on the line 6—6 of FIG. 2.

The tubular shaft extension 41 is formed with spaced openings or slots 57 in the general area of the threaded portions 49 and 53 of the rod 47. The nuts 51 and 55 have secured thereto, by suitable bolts, adjusting key members 59 which are formed with flanges 61 for securing said key members 59 and nuts 51 and 55 to sleeve members 63 slidably positioned on the outer surface of the tubular shaft extension 41. The shaft extension 41 has affixed thereto intermediate the keys 59 a hub member 65 which has secured thereto an annular disc 67 which is provided with a plurality of peripherally spaced elongated slots 69. The slots 69 each have slidably mounted therein a block 71 which carries a pin 73 the ends of which are secured to a depending yoke 75 of an annular drum segment 77. The segments 77 are provided with a pair of toggle members 79 which are pivotally connected to a spider 81 which is supported on the sleeve member 63 for movement towards and away from the hub member 65. The annular disc 67 has secured thereto a plurality of spaced guide members 83 the ends of which project through suitable apertures in the spider 81. The annular disc 67 also has mounted therein a spider contraction and expansion equalizer 84, FIG. 3, a pinion member 85, FIG. 4, that engages a pair of racks 87 that are secured to their respective spider members 81 by screws 88 for coordinating the movement of one spider member 81 with another spider member 81. The annular disc member 67 has mounted thereon a plurality of double acting pneumatic cylinders 89 having piston rods 91 projecting therefrom and connected to the spiders 81. Suitable hose members, not shown, are provided to connect opposite ends of the cylinders 89 with the air passageways 38 and 39 for controlled movement of the spiders 81 towards and away from the annular disc member 67.

The annular drum segments 77 have annular shoe members 93 mounted thereon by suitable studs 95 threaded into the segments 77. The inner surface of the shoe members 93 are drilled to receive an alignment dowel pin 97 which projects into a complimentary recess formed in the face of the annular drum segment 77. The outer winged portions 99 of each shoe member 93 have slots 101 milled therein to receive adjusting bolts 103 carried by guide segments 105 that are adjustably positioned on the outer face of the shoe members 93 to align the belts as they are positioned upon the shoe members 93 of the building drum.

In order to build tires of different sizes wherein the diameter of one tire differs from the diameter of another size tire the building drum of the present invention is capable of adapting to such changes through the substitution of one set of shoe members 93 for another set. Thus, in building tires of 13 inch size one set of shoes 93 would be used while tires of 16 inch size would use shoes of a larger size. The shoes 93 are readily removed from and replaced by other shoes on the annular segments 77 and any fine or minute adjustments for size are then carried out through the nuts 51 and 55 in conjunction with threaded rod 47.

In the use of the building drum, air, under pressure, is delivered through the passages 36, 37, 38 and 39 to the double acting pneumatic cylinders 89 through hoses, not shown, for actuating the piston rods 91 and in turn the spiders 81 and toggle members 79 so that the segments 77 and annular shoe members 93 are radially expanded or contracted to a predetermined distance. The guide segments 105 are then adjustably positioned on the outer surface of the shoe segments 93 by the adjusting bolts 103 to the desired width of the belts to be used. The end of a belt is then placed on the outer surface of one of the shoe segments 93 and the drum is then rotated by the rotatably driven shaft 25 for a complete revolution after which the belt is severed. Any additional belts are applied in the same manner as well as tread stock and the inherent adhesive characteristics of the belts and tread stock will engage them to adhere to one another.

The belts and tread stock are removed from the drum by a transfer ring which is capable of being moved into concentric relation with the building drum to where the tread stock and belts are engaged and removed from the drum. At the time of removing the tread stock and belts the air from the passages 36, 37, 38 and 39 is directed to the other face of the pistons in the cylinders 89 so as to retract the shoe members 93 by causing the spider members 81 and drum segments 77 to collapse.

THE TRANSFER RING

Figure 10:
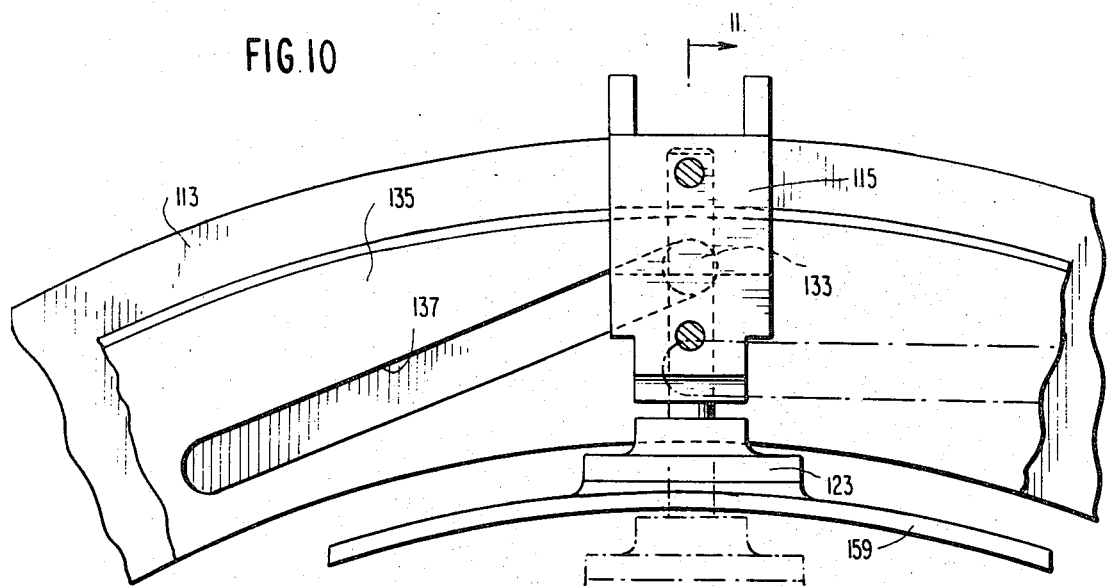
FIG. 10 is a detailed view of a portion of the transfer ring showing one of the segments for engaging the belts and tread stock.
Figure 11:
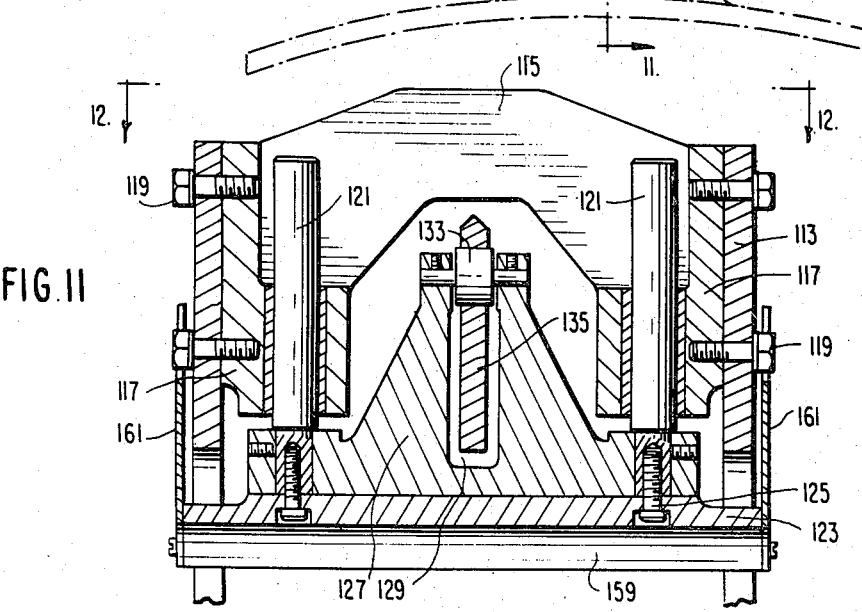
FIG. 11 is a detailed sectional view of a belt and tread stock engaging segment, the view being taken on the line 11—11 of FIG. 10.
Figure 12:
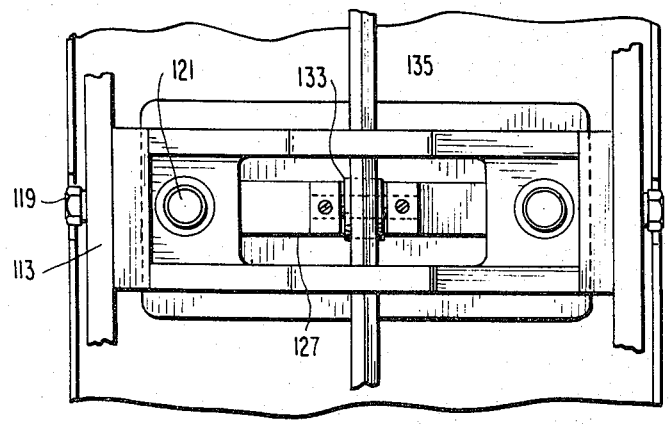
FIG. 12 is a plan view of the segment shown in FIG. 11, the view being taken on the line 12—12 of FIG. 11.
Figure 14:
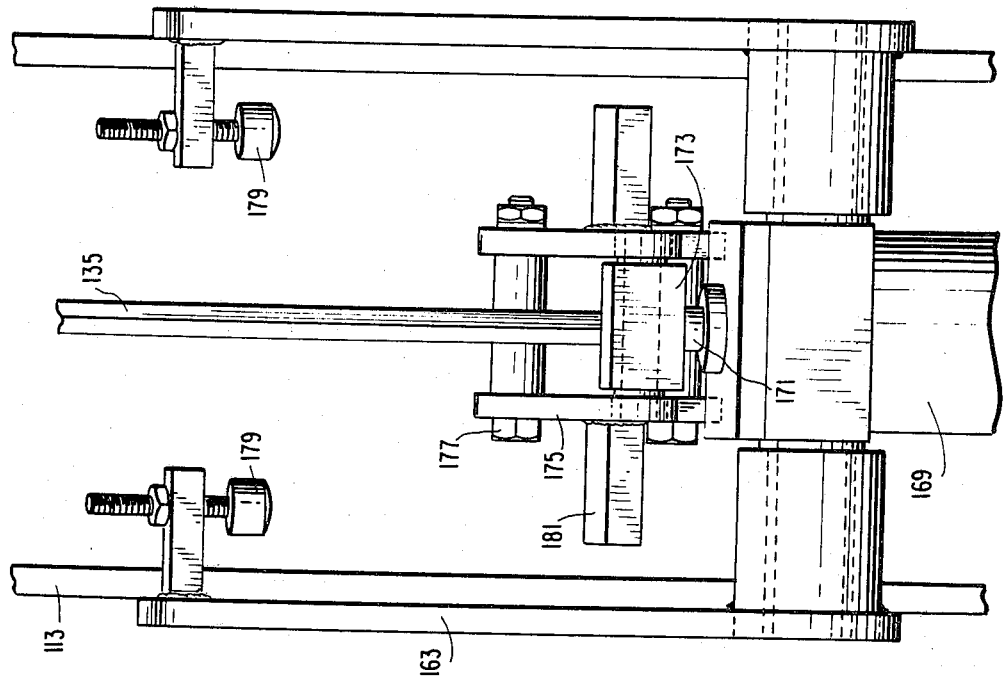
FIG. 14 is another view of the actuating mechanism of FIG. 7.

There is shown in FIGS. 7–14 a transfer ring which is mounted on and carried by a cradle that is supported on the base member for movement with respect thereto and including a base 107 having a pair of vertically spaced plate members 109 that have secured thereto by suitable bolts 111 a pair of spaced annular side members 113. The side members 113 have interposed therebetween in annular spaced relation a plurality of yoke members or guide blocks 115 which terminate at their respective sides in depending bosses 117. The guide blocks 115 are secured to the annular side members 113 by suitable mounting screws 119 while the depending bosses 117 are formed with lined apertures for receiving guide pins 121 which have a shoe adapter or element 123 secured to their lower ends by fasteners 125. The shoe adapter 123, FIG. 11, is formed on its inner face in the central portion thereon, with an upwardly projecting segment 127 that has an annular slot 129 formed therein. The upwardly projecting segment 127 has mounted in the upper end thereof a transverse shaft 131 which supports a cam roller 133 within said slot 129. The annular side members 113 have positioned therebetween a cam ring or plate 135 which is formed with a plurality of inclined cam slots 137 spaced throughout said ring. The cam slots 137 are adapted to receive the rollers 133 so that the position of the rollers within the slots 137 determines the radial position of the shoe adapter 123. A plurality of cam ring supporting elements are also mounted between the side members 113 and said supporting elements are arranged in 120 degree spaced relation with one another and include a grooved roller 139, FIG. 8, that is mounted on and carried by a shaft 141 the ends of which are supported in bosses 143 that are in turn connected to and carried by a sleeve member 145 by means of suitable arms 147. The inner faces of the annular side members 113 have mounted thereon by suitable screws a bracket 149 which has secured to an end thereof an inwardly projecting segment 151 that is drilled and tapped to receive a set screw 153 that engages and acts upon a plate member 155 carried by the bosses 143. The sleeve member 145 is attached to the annular side members 113 by means of a pin 157 for pivotal movement with respect thereto so that adjustment of the set screw 153 will result in movement of the grooved cam roller 139 about the pin 157. The cam roller 139 is preferably formed with an annular V shaped groove or surface which engages a complimentary surface formed on the cam ring 135 to insure its proper retention and positioning in relation to the side members 113.

The inner face of the shoe adapter 123 has affixed thereto, by suitable pins or screws, a pick up segment member 159, FIG. 10, which is the element that engages the belt-tread assembly on the building drum for the purpose of removing said assembly from the drum. Each adapter 123 and its attached segment member 159 is capable of moving in a radial path with respect to the center of the annular side members 113. The outer edges of each segment member 159 are provided with vertically extending safety members 161 which overlie a portion of the side members 113, FIG. 11, and act as guards during the movement of the pick up segment members 159.

Figure 7:
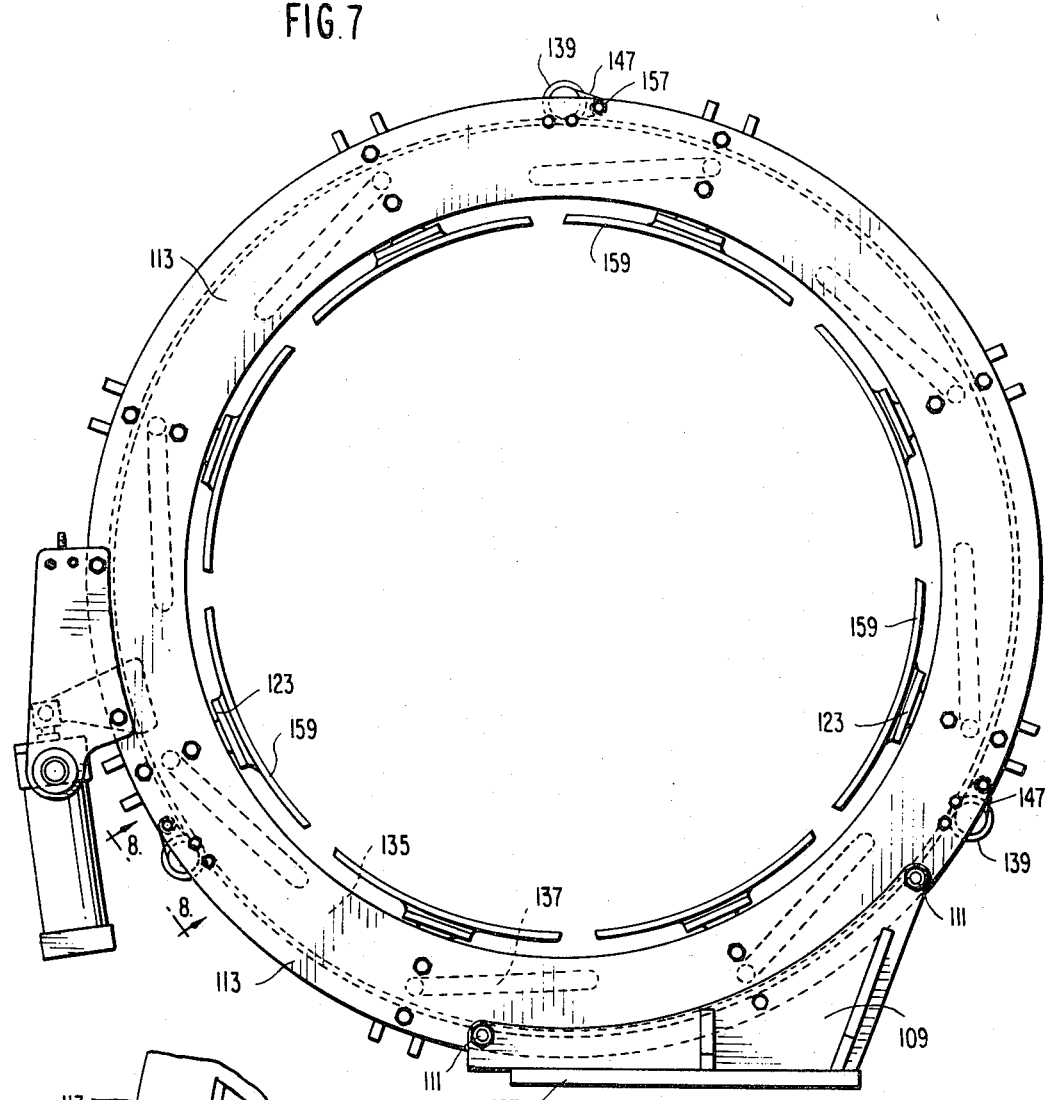
FIG. 7 is an end elevational view of the transfer ring shown in FIG. 1.
Figure 9:
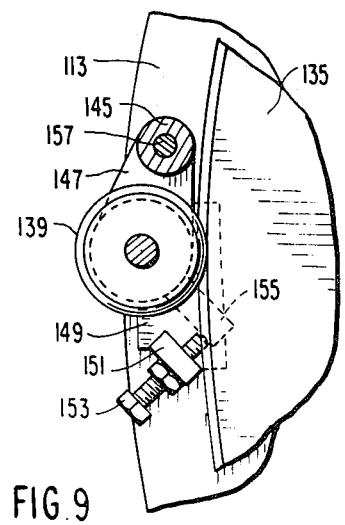
FIG. 9 is another detailed sectional view of a segment of the transfer ring, the view being taken on the plane 9—9 of FIG. 8.
Figure 8:
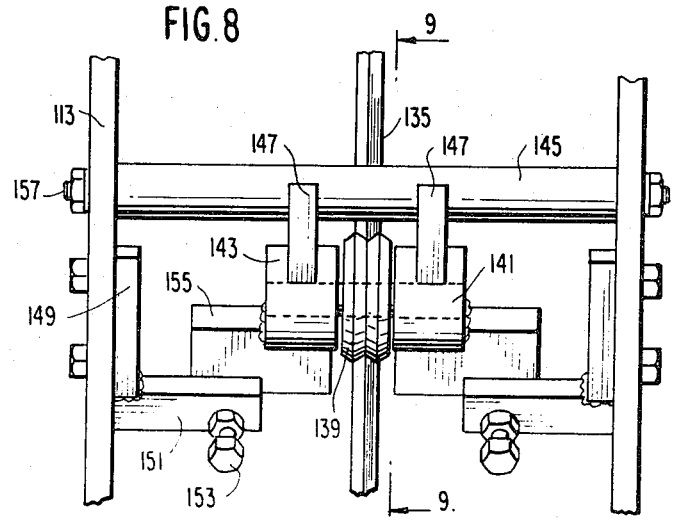
FIG. 8 is a detailed sectional view of a segment of the transfer ring, the view being taken on the plane 8—8 of FIG. 7.
Figure 13:
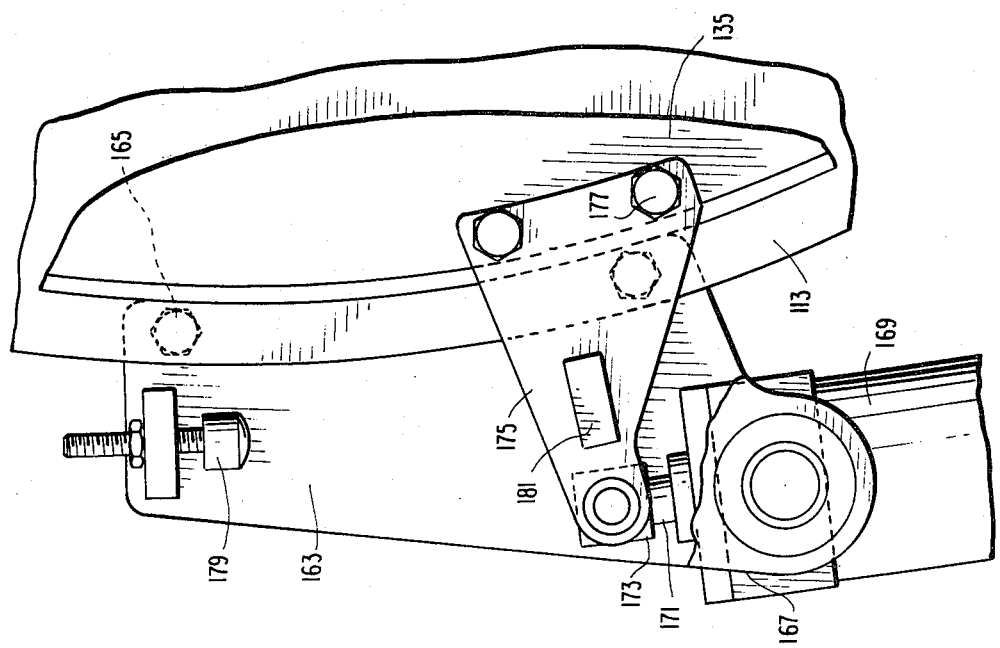
FIG. 13 is an enlarged view of the cam plate actuating mechanism of FIG. 7.

The annular side members 113, FIGS. 7 and 13, have a pair of brackets secured thereto in spaced parallel relation by bolts 165. The lower portion of each bracket 163 terminates in a boss 167 for the reception therebetween of an air cylinder 169. The cylinder 169 has a piston rod 171 projecting from the upper end thereof which is provided with an adapter 173 which has pivotally secured thereto a pair of spaced parallel arms 175. The free ends of the arms 175 are fastened to the cam ring or plate 135 by bolts 177 so that movement of piston rod 171 will result in movement of the cam ring or plate 135 and the subsequent movement of the pick up segment members 159 in a radial direction with respect to the annular side members 113. The brackets 163 have mounted therebetween, adjacent their upper ends, adjustable stops 179 which are engagable by abutments 181 mounted on the arms 175 to limit the movement of the piston rod 171 and arms 175 with respect to the cylinder 169. Thus the adjustment of the stops 179 will determine the degree of rotatable movement of the cam ring or plate 135 and the subsequent movement of the roller 50 in the cam slots 137 to control the radial expansion and contraction of the pick up segments 159.

In the use of the transfer ring, the cam ring or plate 135 is rotated with respect to the annular side members 113 by the power cylinder 169 and piston rod 171. The rotative movement of the cam ring or plate 135 causes the cam slot 137 to move the roller 133 which in turn moves the segment 127 and pick up segment 159 in a radial path with respect to the pair of spaced annular side members 113. The cam ring or plate 135 is supported at all times by cam ring supporting elements that are interposed between and secured to the annular side members 113 and which supporting members are arranged in 120 degree spaced relation to one another between said side members. The degree of rotation of the cam plate or ring 135 on the grooved roller 139 of the ring supporting elements determines the radial distance the pick up segment members 159 move towards and away from the center of the annular side members 113.

THE FINAL ASSEMBLY MECHANISM

The final assembly mechanism as shown in FIG. 1, includes a pair of disc members rotatably mounted on the common ends of a pair of coaxial shafts which in turn are supported on a vertical column for oscillation with respect thereto. A stitcher mechanism is positioned adjacent the base member and actuating means are utilized for pivoting the coaxial shafts and disc members so as to bring the carcass and belt-tread assembly, supported on said discs, into engagement with a stitcher-drive wheel provided on said stitcher mechanism. The carcass and belt-tread assembly supported on said rotatable disc members are rotated by said stitcher-drive wheel while the conventional stitcher wheels engage said belt-tread assembly for stitching same to said carcass.

Figure 15:
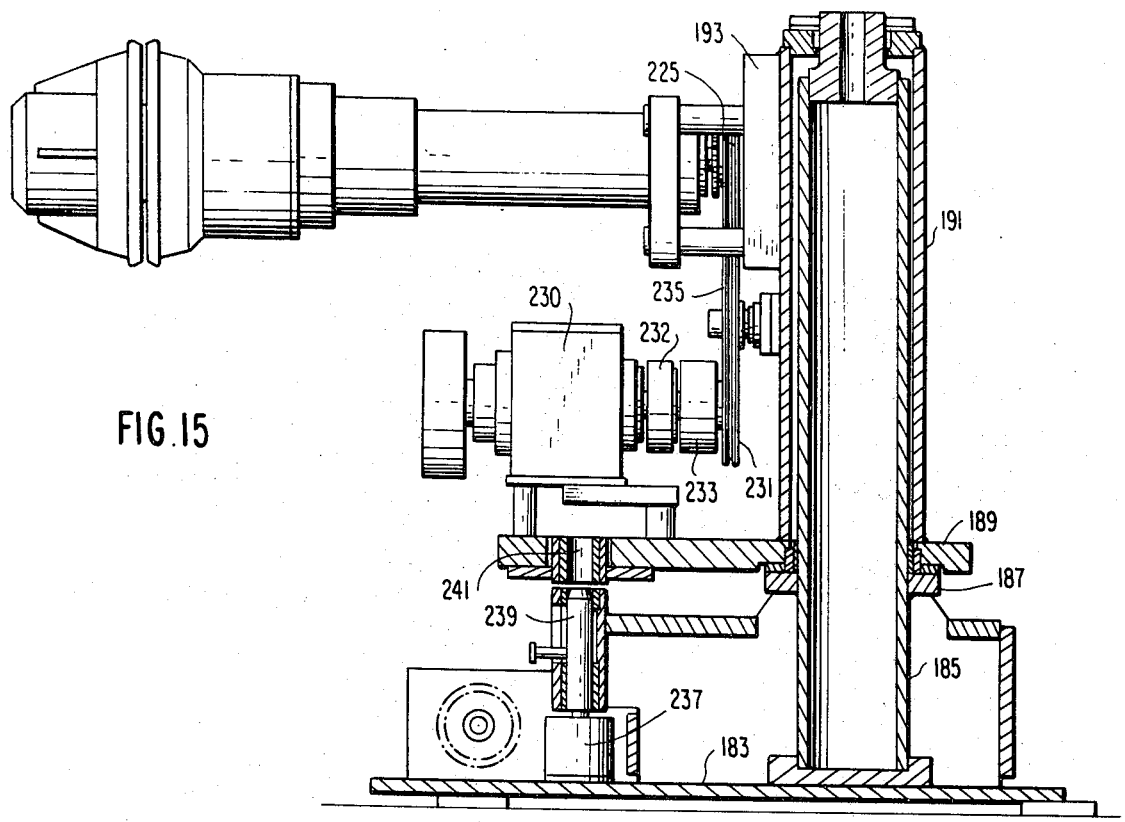
FIG. 15 is a vertical elevational view of a portion of the final assembly mechanism.
Figure 18:
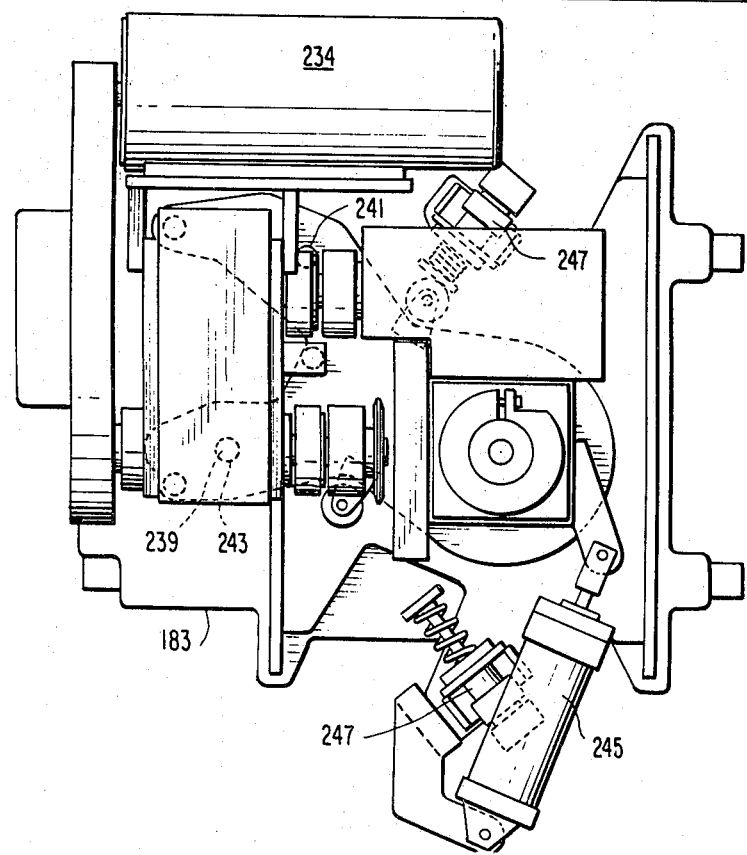
FIG. 18 is a plan view of the final assembly mechanism shown in FIG. 15.
Figure 16:
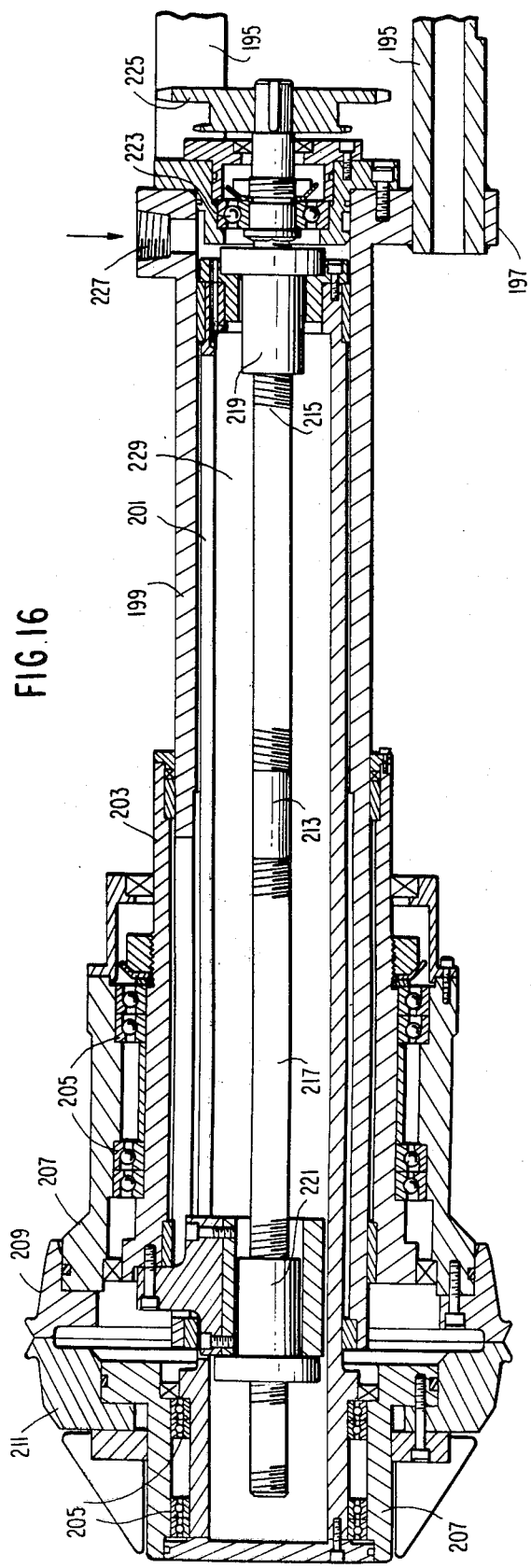
FIG. 16 is a vertical sectional view of the coaxial shafts and their support with rotatable disc members being mounted on a common end of said shafts and being shown in closed position.
Figure 17:
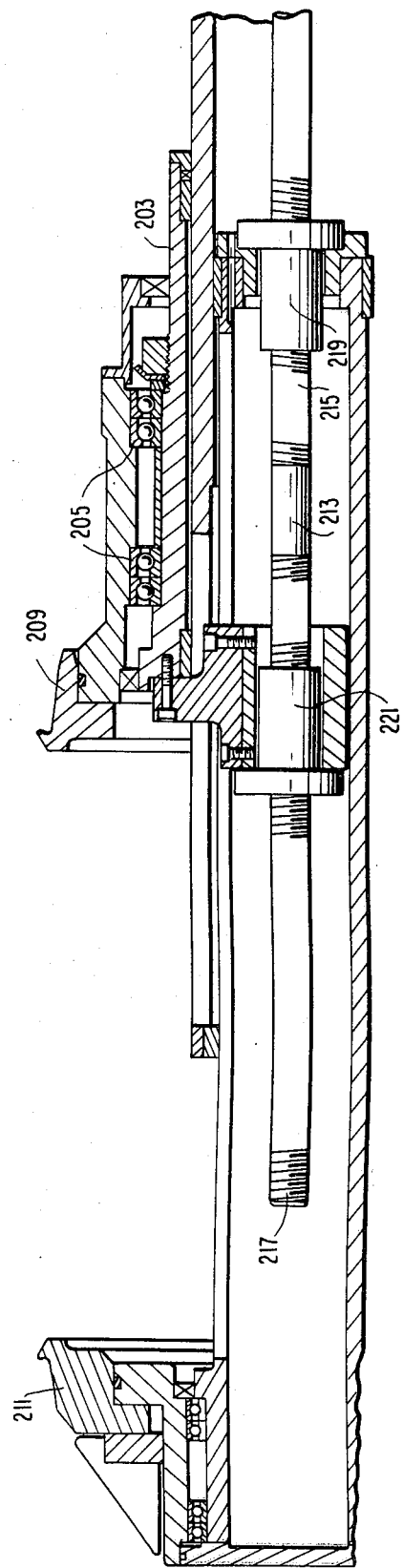
FIG. 17 is a detailed view of the shafts and disc members shown in FIG. 16, with the disc members being in an open position.

As shown in FIGS. 15 and 18, there is a platform 183 that is supported on the base member and which has secured thereto a vertically extending column 185. The column 185 is provided with a collar 187 that has pivotally mounted thereon a support plate 189. A vertically extending sleeve 191 is mounted on the plate 189 and said sleeve encompasses the column 185 with the upper end of the sleeve having a block 193, FIG. 15, secured thereon. The block 193 is formed with a plurality of spaced apertures for receiving sleeves 195, FIG. 16, that are bolted to said block for carrying a flange member 197. The flange member 197 has formed therewith a horizontally extending tube 199 that constitutes a support for an inner sleeve member 201 and an outer sleeve member 203. The inner an outer sleeve members are equipped with suitable bearings 205 which provide for the rotational support of collars 207 that carry disc members 209 and 211. The tube 199 and the inner and outer sleeve members 201 and 203 have extending there through a rod 213 which is formed with threads 215 and 217 of opposite pitch at its inner and outer end portions. The threaded ends of the rod 213 are provided with suitable nuts 219 and 221 which engage the inner and outer sleeves 201 and 203 for moving said sleeves toward and away from one another. The innermost end portion of the rod 213 is supported in a bearing 223 mounted in the flange 197 with the end of the rod 213 having a sprocket 225 secured thereto. The flange 197 is formed with an air inlet port 227 for delivering air into the coaxial space 229 from where it flows into the first stage tire carcass that is supported upon the disc members 209 and 211. This causes the tire carcass to become partially inflated and assume a toroidal shape during which time the disc members are gradually moved towards one another. The air is also exhausted from the coaxial space 229 through said port 227 and suitable sealing means are provided at all points of rotational and linear motion of the various parts thereby creating an air tight chamber.

The support plate 189 has mounted thereon a multiple speed drive mechanism 230 which has a shaft and sprocket 231 projecting therefrom with suitable clutch 232 and brake mechanism 233 for the control of said drive mechanism 230 being associated with said shaft. The drive mechanism 230 is driven by a suitable motor 234 by means of a conventional sprocket or belt drive. A chain 235 is entrained about the sprockets 231 and 225 for rotating the rod 213 which movement causes the disc members 209 and 211 to move axially with respect to one another. The platform 183 has mounted thereon an air cylinder 237 that is provided with a plunger 239 which extends through apertures 241 and 243 provided in the plate 189 for holding said plate in a locked position. When the plunger 239 extends through the aperture 243 the plate 189 is in the position shown in FIG. 18 wherein the tube 199 is in axial alignment with the center of the transfer ring and the building drum. When the plunger 239 extends through the aperture 241 the plate 189 has been pivoted about column 185 to be locked in the position shown in FIG. 19. The plate 189 is provided with a cylinder and piston 245 that moves said plate about the column 185 from the position of FIG. 18 to the position of FIG. 19. Hydraulic deaccelerators 247, FIG. 18, are provided to cushion the movement of the plate 189 in its movement from one position to the other.

The final assembly mechanism has associated therewith, FIG. 1, a stitcher mechanism that is positioned in spaced relation to the tube 199 and carcass supporting disc members 209 and 211 wherein said stitcher is angularly disposed and offset with respect to the longitudinal axis of the base member. The stitcher mechanism includes a base 249, FIG. 19, which has mounted thereon, conventional stitcher wheels 251 that are carried and manipulated by suitable arms 253 in the conventional manner. The forward end of the stitcher is provided with a pair of spaced parallel arms 255 which constitute supports for a second pair of arms 257 that have rotatably mounted therein a stitcher-drive wheel 259. A suitable motor and belt drive 261 is provided for rotating the stitcher-drive wheel 259. The arms are provided with suitable means for rotating said arms and stitcher-drive wheel 259 about the axis of a shaft 263 carried by the ends of the arms 255. This arrangement permits the stitcher-drive wheel 259 to be elevated so as to engage with and drive a tire carcass and belt-tread assembly of various diameters. The stitcher mechanism is provided with an adjusting mechanism 265 to permit the movement of said stitcher mechanism upon a suitable support base to compensate for tires of varying diameters.

Figure 19:
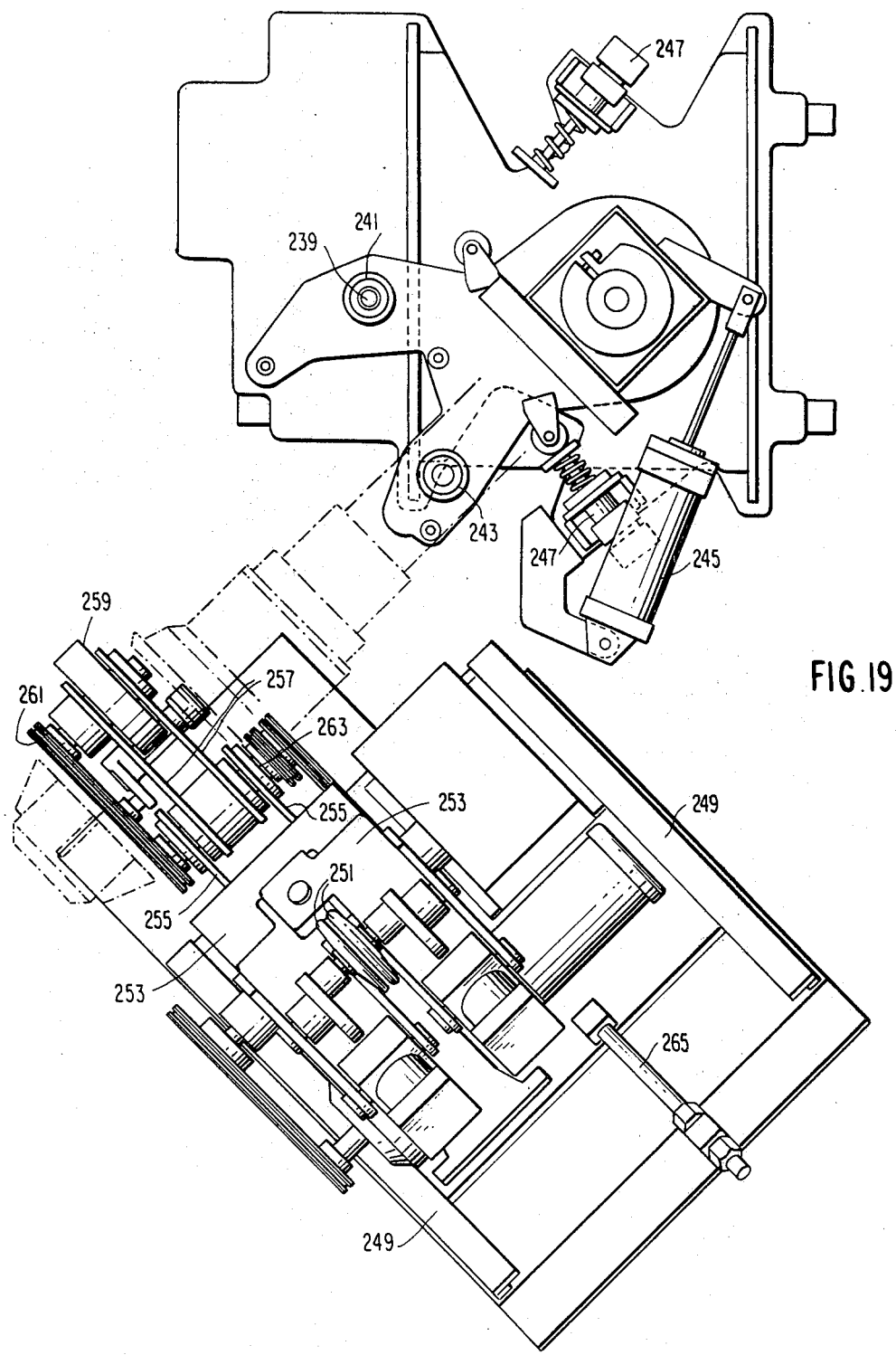
FIG. 19 is a plan view of the final assembly mechanism of FIG. 15 rotated into engagement with the stitcher mechanism portion of the present invention.

The carcass and belt-tread assembly which is carried by the disc members 209 and 211 is moved from the position of FIG. 1 to the position of FIG. 19 whereby the stitcher-drive wheel 259 will engage the equatorial surface of the belt-tread assembly. The rotation of said stitcher-drive wheel 259 will cause the carcass and belt-tread assembly to be rotated about bearings 205 on the end of tube 199 and at the same time the center of said belt-tread assembly will be stitched to the carcass subassembly. Upon the completion of this stitching operation the stitcher-drive wheel 259 will continue to drive and rotate the carcass and belt-tread assembly to wherein the stitcher wheels 251 will engage the belt-tread assembly for stitching same to the carcass subassembly in the conventional manner.

In the use of the tire buidling machine of the present invention the base member has the tire building drum positioned at one end and the final assembly mechanism mounted at the other end with the transfer ring interposed therebetween but adapted to move on said base from one end to the other.

The building drum is connected to and driven by a conventional building machine head stock through a shaft which rotates the drum about its axis. The surface of the drum consists of a plurality of arcuate segments or shoes that are adapted to contract and expand radially and in unison through the reciprocatory movement along the axis of the shaft by the spider elements. The outermost edge portion of the spiders having toggle links connected thereto which links are also connected to annular drum segments that have mounted thereon annular shoe members. The spiders are connected to piston and cylinder structures that are actuated to radially move the annular shoe members thereby causing them to expand or contract.

A plurality of belts are received from a servicer and are positioned upon the outer surface of the annular shoe members within an area defined by annular guide elements with one belt being superimposed upon the previous belt. A tread stock element is then received from a servicer and applied to said belts on said drum. The transfer ring is then moved to encompass said drum whereby the segment members of said ring are radially contracted or moved inwardly to engage the belt-tread stock assembly and remove same from the building drum. At the time of removal of the belt-tread stock assembly by the transfer ring the spiders are actuated by the piston and cylinder structure to cause the spider and toggle links to positively contract the annular shoe members in unison. The transfer ring is then moved from one end of the base member to the other end wherein the final assembly mechanism is supported on a vertically extending column.

The final assembly mechanism includes a pair of coaxial shafts supported on said vertically extending column with disc members rotatably mounted on the free ends of the shafts. The coaxial shafts have positioned therein a rotatable rod that is supported by the vertically extending column with suitable threads of opposite pitch being provided on the ends of said rod with nuts on the threaded portions for axially actuating the disc members in a contractable and expansible manner. The disc members receive a first stage carcass and the disc members are actuated to move away from one another to engage the bead areas of the first stage carcass whereby air is introduced into the area between the expanded disc members to inflate the carcass so it assumes a partial toroidal shape. The belt-tread assembly carried by the transfer ring encompasses the partially expanded first stage carcass so that the carcass, upon further expansion, engages said belt-tread stock assembly and adheres to same contemporaneous with the release of the belt-tread stock assembly by the transfer ring which then returns to its original position.

The belt-tread assembly is then engaged by a stitcher assembly whereby the stitcher-drive wheel of said assembly engages the belt-tread assembly in the center or median portion thereof to effectively stitch this portion or area of the belt-tread assembly to the carcass contemporaneous with rotatably driving the carcass and belt-tread assembly and the rotatable disc members carried on the ends of the coaxial shafts. Upon the completion of the stitching in the center or median portion by the stitcher-drive wheel the conventional two wheels of a stitcher are brought into engagement with the belt-tread assembly which is rotatably driven by the stitcher-drive wheel to complete the stitching of the belt-tread stock assembly to the carcass.

The coaxial shafts and rotatable disc members with the carcass and belt-tread stock assembly may be pivoted about the column 185 into engagement with the stitcher apparatus that is positioned adjacent to said base member in the manner as illustrated in FIGS. 1 and 19. This arrangement enables the machine operator to readily remove the stitched tire from the disc members and to place a first stage carcass on the disc members which have been moved into engagement with one another so that said shafts may be pivoted back to their initial position to receive a belt-tread stock assembly from the transfer ring.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A tire building machine having a base member with an expansible and contractable drum mounted on one end thereof and a final stage assembly mounted on the other end with a transfer ring interposed therebetween and axially movable towards and away from said ends, said final stage assembly comprising a vertical support member, a pair of horizontally disposed coaxial shafts supported by said support member, a disc member mounted on a common end of said shaft with said disc members being freely rotatable with respect to said shafts, said disc members receiving and supporting a first stage tire carcass having bead areas, means connected to said shaft for moving said disc members into engagement with the bead areas of said carcass.

2. A tire building machine as set forth in claim 1 wherein said coaxial shafts have a tube interposed therebetween with said tube being connected to said support, one of said shafts being slidably mounted on the exterior surface of said tube and the other shaft being slidably positioned on the interior surface of said tube.

3. A tire building machine as set forth in claim 2 wherein said coaxial shafts are provided with bearings adjacent an end thereof for rotatably supporting said disc members thereon.

4. A tire building machine as set forth in claim 3 wherein said tube has a rod positioned therein with threaded areas on said rod of opposite pitch, nut members on said threaded areas, said nuts engaging said shafts for moving said disc members towards and away from one another.

5. A tire building machine as set forth in claim 2 wherein each of said disc members is formed with an annular external groove that terminates in an annular outwardly projecting flange which engages the bead area of said tire carcass to effectively seal the tire carcass on said disc members.

6. A tire building machine as set forth in claim 2 wherein said column has a plate supported thereon for rotation with respect thereto, a sleeve carried by said plate and enclosing said support, said sleeve having a block provided for supporting said tube and rod, means connected to said plate for rotating said plate, tube shafts and rod about said column.

7. A tire building machine comprising a base member having an expansible and contractable drum mounted on one end thereof for rotation with respect thereto and a final stage assembly mounted on the other end with an expansible and contractable transfer ring interposed therebetween and axially movable toward and away from said ends of said base member, said drum having a plurality of belts and a tread stock positioned thereon, said final stage assembly including a vertical support having horizontally disposed coaxial shafts supported thereon, a disc member mounted on a common end of each shaft with said disc members being freely rotatable with respect to said shafts, said disc members receiving and supporting a tire carcass having bead areas, means connected to said shafts for moving said disc members into engagement with the bead areas of said carcass, said transfer ring encompassing and engaging said belt-tread assembly for transferring said assembly to a position encompassing but radially spaced from said carcass, means for expanding said carcass into engagement with said belt-tread assembly contemporaneous with moving said disc members towards one another while said carcass assumes a toroidal shape to facilitate the transfer of the belt-tread assembly from said ring to said carcass, and stitcher means engaging said carcass and belt-tread assembly and rotatably driving said carcass and belt-tread assembly and thus rotating said freely rotatable disc members on the ends of said shafts while stitching said belt-tread assembly to said carcass.

8. A tire building machine as set forth in claim 7 wherein said vertical support is provided with means for pivoting said shafts to angularly position said shafts and carcass and belt-tread assembly with respect to said base member and a stitcher apparatus engaging the angularly positioned carcass and belt-tread assembly for rotating same contemporaneous with stitching said belt-tread assembly to said carcass.

9. A tire building machine as described in claim 7 wherein said expansible and contractable drum includes a rotably driven shaft having connected thereto a tubular shaft extension having a plurality of spiders slidably mounted thereon, toggle members connected to said spiders, and annular drum segments carried by said toggle members.

10. A tire building machines as set forth in claim 9 wherein said shaft extension has a disc member secured thereto with said annular drum segments slidably connected to said disc member and annular shoe members secured to said drum segments.

11. A tire building machine as set forth in claim 10 wherein said shaft extension is provided with a pair of spaced sleeves for slidably receiving said spiders and piston and cylinder members connected to said disc member and said spiders for slidably positioning said spiders on said sleeves.

12. A tire building machine as set forth in claim 11 wherein said annular drum segments are adapted to receive annular shoe members of different sizes commensurate with the size range of the tire being built with said shoe members having annular guide segments adjustably secured to the outer face of said shoe members.

13. A tire building machine as set forth in claim 1 wherein said final stage assembly includes a rotatably driven rod having spaced areas which are threaded in opposite directions with a nut threaded on each of said threaded areas with the nut on one section engaging one of said coaxial shafts and the nut on the other section engaging the other coaxial shaft for moving said disc members and the beads of said carcass toward and away from one another upon the rotation of said rod.

14. A tire building machine as set forth in claim 7 wherein said stitcher apparatus includes a plurality of stitcher wheels with the intermediate wheel being power driven and engaging the center portion of the belt-tread assembly for stitching same to said carcass while rotatably driving said carcass and belt-tread assembly during its stitching by the remaining stitcher wheels.

* * * * *